US008488573B2

(12) United States Patent
Kovacik et al.

(10) Patent No.: US 8,488,573 B2
(45) Date of Patent: Jul. 16, 2013

(54) APPARATUS AND METHOD FOR DELIVERING PUBLIC SWITCHED TELEPHONE NETWORK SERVICE AND BROADBAND INTERNET ACCESS

(75) Inventors: Christopher M Kovacik, Crown Point, IN (US); Jesse Ramos, Gary, IN (US); Cary Smith, Crown Point, IN (US)

(73) Assignee: Midwest Telecom of America, Inc., Merrillville, IN (US)

( * ) Notice: Subject to any disclaimer, the term of this patent is extended or adjusted under 35 U.S.C. 154(b) by 1017 days.

(21) Appl. No.: 12/393,788

(22) Filed: Feb. 26, 2009

(65) Prior Publication Data
US 2009/0225733 A1 Sep. 10, 2009

Related U.S. Application Data

(60) Provisional application No. 61/064,308, filed on Feb. 27, 2008.

(51) Int. Cl.
*H04W 4/00* (2009.01)
*H04L 12/66* (2006.01)

(52) U.S. Cl.
USPC .......................................... 370/338; 370/352

(58) Field of Classification Search
USPC ................................. 370/338, 352
See application file for complete search history.

(56) References Cited

U.S. PATENT DOCUMENTS

| | | | | |
|---|---|---|---|---|
| 5,742,907 | A * | 4/1998 | Brown ........................... | 455/503 |
| 7,324,510 | B2 * | 1/2008 | Howe ............................. | 370/386 |
| 7,327,286 | B2 * | 2/2008 | Knoska et al. ................ | 340/984 |
| 7,394,818 | B1 * | 7/2008 | Johnson et al. ............... | 370/401 |
| 7,616,945 | B1 * | 11/2009 | Cardina et al. .............. | 455/412.2 |
| 7,738,636 | B1 * | 6/2010 | Wageman et al. ......... | 379/88.12 |
| 7,978,689 | B1 * | 7/2011 | Briggs ........................... | 370/353 |
| 8,089,400 | B1 * | 1/2012 | Fang et al. ................ | 342/357.42 |
| 2002/0094776 | A1 * | 7/2002 | Pulver .......................... | 455/3.05 |
| 2002/0137533 | A1 * | 9/2002 | Struhsaker et al. ........... | 455/502 |
| 2002/0151270 | A1 * | 10/2002 | Johnston ...................... | 455/3.05 |
| 2003/0228912 | A1 * | 12/2003 | Wells et al. ..................... | 463/43 |
| 2004/0095925 | A1 * | 5/2004 | Cody et al. .................... | 370/352 |
| 2006/0034184 | A1 * | 2/2006 | Karaoguz et al. ............. | 370/252 |
| 2006/0098632 | A1 * | 5/2006 | Johnson ........................ | 370/352 |
| 2006/0239188 | A1 * | 10/2006 | Weiss et al. ................... | 370/229 |
| 2007/0022481 | A1 * | 1/2007 | Goldman et al. .............. | 726/26 |
| 2007/0071026 | A1 * | 3/2007 | Rogers .......................... | 370/458 |
| 2007/0112907 | A1 * | 5/2007 | Defosse ........................ | 709/200 |
| 2007/0208864 | A1 * | 9/2007 | Flynn et al. ................... | 709/227 |
| 2007/0258442 | A1 * | 11/2007 | Mikleton et al. .............. | 370/356 |
| 2008/0177644 | A1 * | 7/2008 | Reese ............................. | 705/30 |

(Continued)

*Primary Examiner* — Farah Faroul
(74) *Attorney, Agent, or Firm* — Kelley Drye Warren

(57) ABSTRACT

Apparatus and methods are disclosed for delivering Public Switched Telephone Network (PSTN), Broadband Internet access and Private Data services using Transmission Control Protocol/Internet Protocol (TCP/IP) over an Ethernet based transport network though a private fixed wireless network. An embodiment of the invention utilizes a Class 4/5 soft switch connected to a private fixed wireless network designed and constructed to deliver near toll quality PSTN, Broadband Internet and Private Data services to a Subscriber. Specifically, a combination of known managed routers, switches, Analog Telephone Adapters (ATA), Integrated Access Devices (IAD), and fixed wireless equipment based on IEEE 802.11x standards may be interconnected with a Class 4/5 soft switch. The resulting network may be uniquely configured to utilize redundant automatic failover backbone connectivity to access points (AP) within the private fixed wireless network. Additionally, the network may utilize TCP/IP prioritization standards throughout the private fixed wireless network to consistently deliver near toll grade quality Voice over Internet Protocol (VoIP).

13 Claims, 17 Drawing Sheets

U.S. PATENT DOCUMENTS

| | | | |
|---|---|---|---|
| 2008/0219185 A1* | 9/2008 | Zou et al. | 370/254 |
| 2008/0247389 A1* | 10/2008 | Horn | 370/389 |
| 2008/0285473 A1* | 11/2008 | Chen et al. | 370/252 |
| 2009/0046706 A1* | 2/2009 | Chernow | 370/352 |
| 2009/0052394 A1* | 2/2009 | Kalhan | 370/331 |
| 2009/0059934 A1* | 3/2009 | Aggarwal et al. | 370/401 |
| 2009/0060530 A1* | 3/2009 | Biegert et al. | 398/214 |
| 2009/0111457 A1* | 4/2009 | Struhsaker | 455/422.1 |
| 2009/0204805 A1* | 8/2009 | Robba et al. | 713/153 |
| 2009/0225744 A1* | 9/2009 | Zerillo | 370/352 |
| 2009/0265563 A1* | 10/2009 | Camagna et al. | 713/300 |
| 2010/0131308 A1* | 5/2010 | Collopy et al. | 705/4 |
| 2011/0231302 A1* | 9/2011 | Stanforth et al. | 705/37 |
| 2012/0115444 A1* | 5/2012 | Gravino et al. | 455/413 |

* cited by examiner

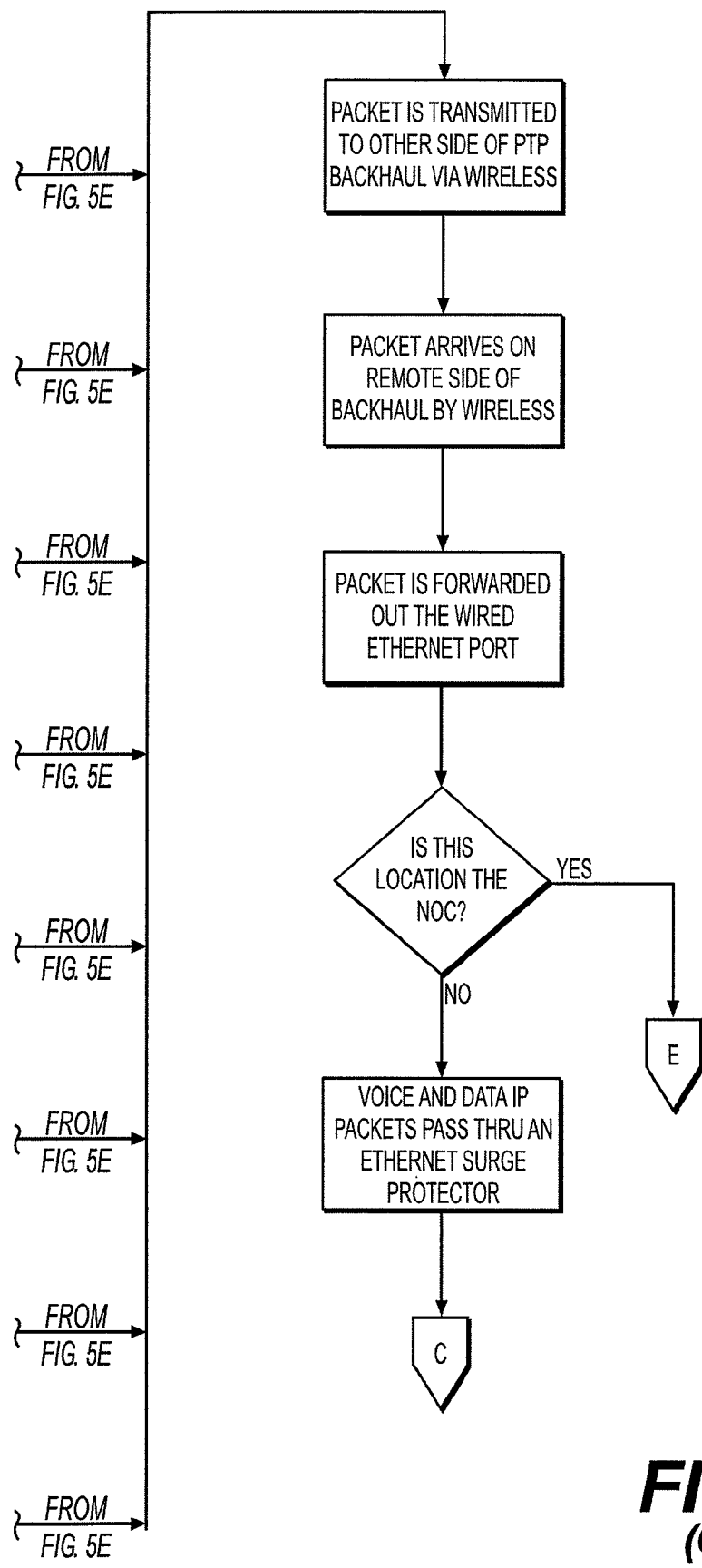
FIG. 5E (CONT')

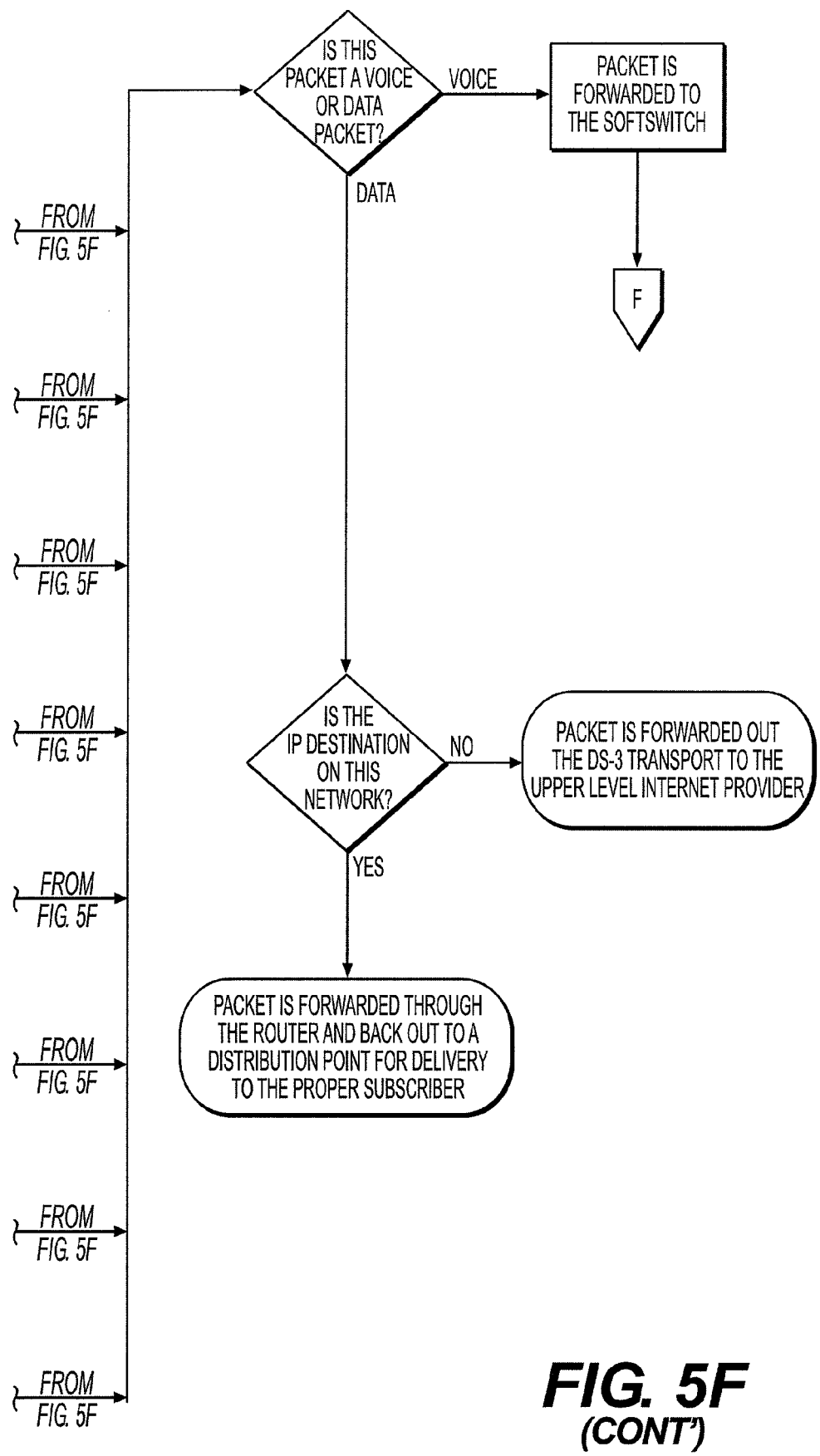
FIG. 5F (CONT')

APPARATUS AND METHOD FOR DELIVERING PUBLIC SWITCHED TELEPHONE NETWORK SERVICE AND BROADBAND INTERNET ACCESS

CROSS REFERENCE TO RELATED APPLICATIONS

The present application relates to, and claims priority on U.S. Provisional Patent Application Ser. No. 61/064,308 filed Feb. 27, 2008, and entitled APPARATUS AND METHOD FOR DELIVERING PUBLIC SWITCHED TELEPHONE NETWORK SERVICE AND BROADBAND INTERNET ACCESS USING TCP/IP OVER AN ETHERNET BASED TRANSPORT NETWORK THROUGH A PRIVATE FIXED WIRELESS NETWORK OPERATING IN THE LICENSED AND/OR UNLICENSED FREQUENCIES, which is hereby incorporated by reference in its entirety.

FIELD OF THE INVENTION

The present invention relates to the field of Telecommunication network mediums, configurations, protocols, and systems; more particularly, the present invention relates to the apparatus and method used to deliver near toll grade quality PSTN, performance guaranteed Broadband Internet and Private Data services using TCP/IP over an Ethernet based transport network through a private fixed wireless network operating in the licensed and unlicensed frequencies to subscribers with various combinations of such services.

BACKGROUND OF THE INVENTION

It has been well documented in the history of the Telecommunications Industry that over the last 100 years PSTN services have been almost exclusively delivered to subscribers over Incumbent Local Exchange Carriers (ILECs) networks using a fixed landline network, in most cases twisted copper wire and of recent fiber optic cable. It is also well documented in the Telecommunications Industry that even today ILECs continue to use the same fixed landline network to not only deliver PSTN services, but additionally Broadband Internet and other Private Data services.

With the rewrite of the Telecommunications Act in 1996 the Telecommunications Industry saw many competitors to the ILEC like Cable TV Companies and Competitive Local Exchange Carriers (CLECs) begin offering PSTN, Broadband Internet and Private Data Services to the ILEC's subscribers. The CLECs and Cable TV Companies followed the ILECs lead and used the same fixed landline network infrastructure to deliver PSTN, Broadband Internet and Private Data services to their subscribers. In most cases the CLECs collocated large amounts of their own network equipment inside the very same buildings or Central Offices owned by their primary competitors the ILECs and leased last mile landline infrastructure from the ILECs in order to deliver services to their subscribers. Cable TV Companies took a different route and elected to spend billions of dollars to upgrade existing landline networks or build out new landline networks in order to deliver PSTN, Broadband Internet and other Private Data services to their subscribers.

Over time it became very evident that there were flaws in the CLEC's and Cable TV Company's business models. Even today, CLECs are still very dependent on the ILECs fixed landline networks and Central Offices to deliver PSTN, Broadband Internet and Private Data Services to their customers. Literally, CLECs are still at the mercy of the ILECs regarding network availability, technical support, provisioning time frames, service repair and ultimately the price they pay for such landline network elements. Simply put, the financial stability of a business model isn't very sound if your main source of network elements and collocation space are being provided by your primary competitor. The Cable TV Companies business model was not much better than the CLECs. When the Cable TV Companies discovered the ILECs were planning on providing bundled services packages for TV content, PSTN, Broadband Internet and Private Data services to their existing subscribers they reacted by spending billions of dollars to upgrade existing landline network or build out new landline network and switching in an attempt to beat the ILECs at their own game by getting into the business of providing PSTN, Broadband Internet Access and Private Data Services to their existing subscribers as well as the ILECs existing subscribers. However, this massive network upgrade took to many years and billions of dollars to accomplish which allowed the ILECs to significantly penetrate large portions of the Cable TV Company's market share by offering a bundled service package of satellite TV in conjunction with Asymmetrical Digital Subscriber Line (ADSL) Internet access and PSTN services over their traditional landline network to the Cable TV Company's subscribers.

It became obvious to smaller CLECs and other small Telecommunications companies that following the CLEC's and Cable TV Company's previous business models would not generate immediate profits or quick returns on network investment. Faced with this financial realization, specific arrangements of apparatus and methods had to be created to overcome flaws associated with the dependency of indefinitely leasing high cost building space and landline network elements from the ILECs and/or investing billions of dollars and taking many years to build out new or upgrade existing landline network infrastructures in order to deliver PSTN, Broadband Internet Access and Private Data services to existing and potential subscribers. Preferably, the methods and apparatus should be capable of completely alleviating the dependency of leasing building space and landline network elements from the ILECs and provide a viable alternative to investing billions of dollars and taking many years to upgrade existing landline networks or build out new landline network infrastructures. Further, the methods and apparatus should be capable of delivering equal or greater levels of performance for PSTN, Broadband Internet Access and other Private Data services associated with today's landline network infrastructures.

One or more embodiments of the present invention accomplish the above by utilizing the apparatus and methods which allow for a low cost and rapid deployment of a TCP/IP over an Ethernet based transport network through a private fixed wireless network operating in the licensed and unlicensed frequencies to be used in the delivery of PSTN, Broadband Internet Access and other Private Data Services to subscribers attached to the TCP/IP over Ethernet based transport network through a private fixed wireless network operating in the licensed and unlicensed frequencies. Embodiments of the present invention may allow the above services to be delivered to the subscribers with equal to or greater than performance levels for PSTN, Broadband Internet Access and other Private Data Services typically associated with landline technologies. Embodiments of the invention may simultaneously eliminate the necessity of paying exorbitant cost to the ILECs for collocation and leasing their landline network elements or taking many years and spending billions of dollars to upgrade or build new landline network infrastructure. Embodiments of the invention may lower ongoing maintenance cost structures to only a fraction of that typically associated with traditional landline network infrastructures. Embodiments of the invention may allow for rapid subscriber installation time frames with significantly lower cost for materials and labor typically associated with the traditional landline network infrastructures as there is no necessity to build out a landline infrastructure from a Central Office to a subscriber.

Most importantly, when compared to traditional CLEC's and Cable TV Company's network build outs and business models, embodiments of the invention may keep small CLECs or other small Telecommunications company's initial investment dollars for their network build out lower. Embodiments of the invention may typically generate greater profit faster, increasing cash flow which should in turn decrease the time necessary to return invested dollars in network build out. As a result, embodiments of the invention may create more free cash to be used in important areas like advertisement, customer acquisition and further network deployment.

Accordingly, embodiments of the invention were created to help small CLECs and other small Telecommunication Companies effectively compete with larger Telecommunication companies using traditional landline network infrastructures like the ILECs and Cable TV Companies without having the burden of being subjected to the exorbitant cost associated with purchasing network elements and collocation from the ILECs, their primary competitors or investing billions of dollars and taking years to build out their own traditional landline network infrastructure.

SUMMARY OF THE INVENTION

The apparatus and method for delivering public switched telephone network (PSTN), broadband Internet and private data services using Transmission Control Protocol/Internet Protocol (TCP/IP) over an Ethernet based private fixed wireless network operating in the licensed and unlicensed frequencies.

Embodiments of the invention may utilize a Class 4/5 soft switch connected to TCP/IP over an Ethernet based transport network through a private fixed wireless network operating in the licensed and unlicensed frequencies which is designed and constructed to deliver near toll quality PSTN, packet performance guaranteed Broadband Internet and Private Data services to a subscriber attached to the TCP/IP over an Ethernet based transport network through a private fixed wireless network operating in the licensed and unlicensed frequencies. Specifically, embodiments of the invention may involve the interconnection of a combination of known managed routers, switches, Analog Telephone Adapters (ATA), Integrated Access Devices (IAD); fixed wireless equipment based on IEEE 802.11x standards to a Class 4/5 soft switch. The embodiments of the invention may be uniquely configured to utilize redundant automatic failover backbone connectivity to access points (AP) within the private fixed wireless network operating in the licensed and unlicensed frequencies. Additionally, embodiments of the invention may utilize TCP/IP prioritization standards throughout the private fixed wireless network to consistently deliver near toll grade quality Voice over Internet Protocol (VoIP).

Embodiments of the invention may utilize a unique deployment of managed switches and routers throughout the TCP/IP over an Ethernet based transport network through a private fixed wireless network operating in the licensed and unlicensed frequencies with associated known routing and switching protocol standards (EIGRP, STP, 802.1p, DSCP and BGP) that help produce the Quality of Service (QoS) and network redundancy to guarantee packet performance which is desired to deliver near toll grade quality PSTN services as well as low latency and low packet loss Broadband Internet access and private data services.

Embodiments of the invention may implement network segmentation using Virtual Local Area Networks (VLAN) based on 802.1q standards to help isolate and troubleshoot possible network infrastructure issues.

Embodiments of the invention may utilize a Global Positioning Satellite (GPS) Clock to time the TDM interconnects with various elements of the PSTN to guarantee correct packet timing and performance when passing telephone calls from a subscriber located on the TCP/IP over Ethernet based transport network through a private fixed wireless network operating in the licensed and unlicensed frequencies to other PSTN providers.

In overview, embodiments of the invention may provide apparatus and methods for providing the delivery of near toll grade quality PSTN, guaranteed data packet performance Broadband Internet and Private Data services using TCP/IP over an Ethernet based transport network through a fixed wireless network operating in the licensed and unlicensed frequencies. The embodiments of the invention may reduce traditional landline network deployment timeframes and the typical cost structures associated with deployment of traditional landline network infrastructures. When compared to traditional landline network infrastructures embodiments of the invention may also significantly reduce the cost of ongoing network infrastructure maintenance, installation time frames to subscribers as well as material and labor costs per subscriber installation.

It is to be understood that both the foregoing general description and the following detailed description are exemplary and explanatory only, and are not restrictive of the invention as claimed.

SUMMARY OF DRAWINGS

In order to assist the understanding of this invention, reference will now be made to the appended drawings, in which like reference characters refer to like elements.

DETAILED DESCRIPTION OF THE PRESENT INVENTION

Figure 1:
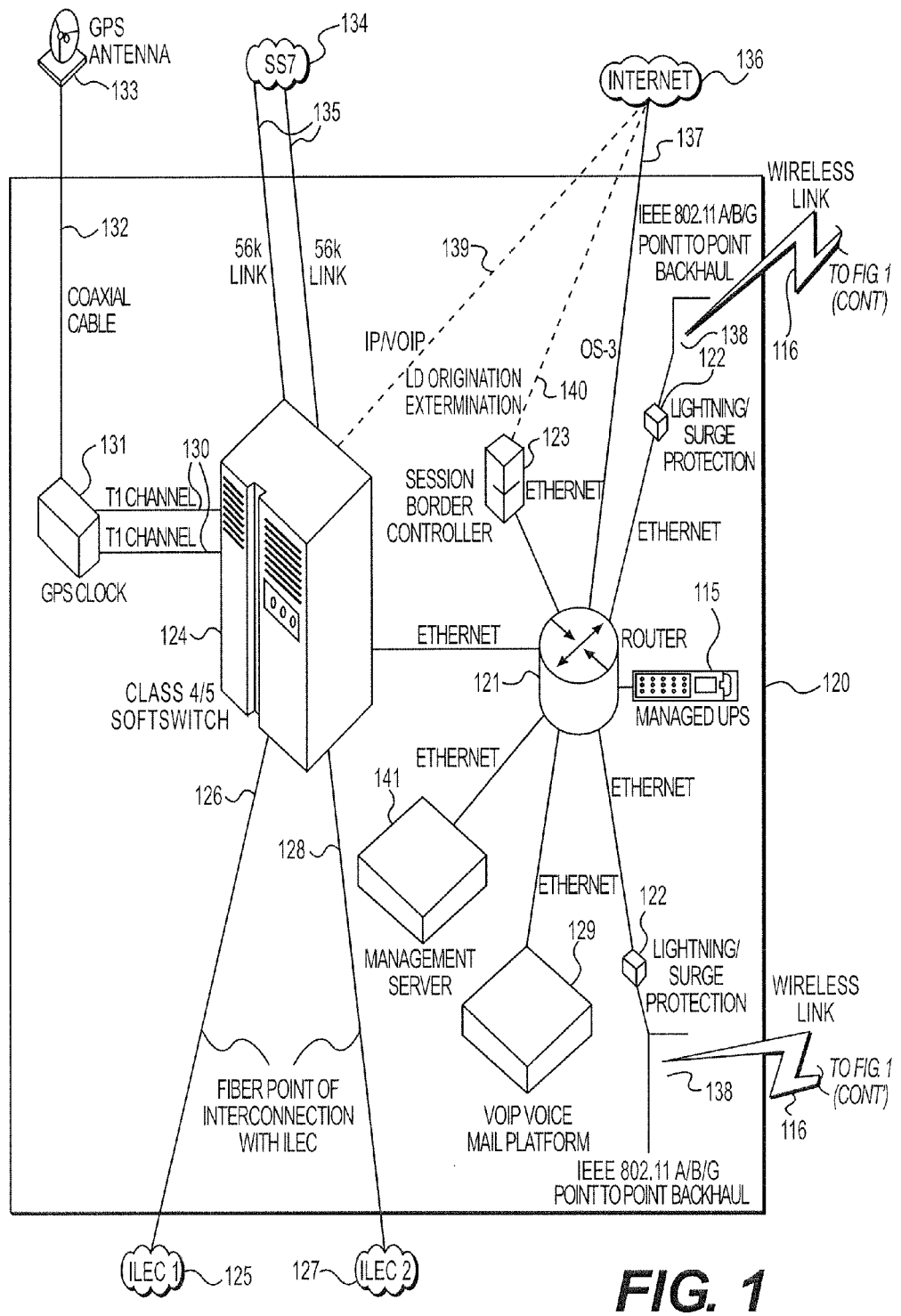
FIG. 1 is an overview diagram illustrating an embodiment of the present invention.
Figure 1:
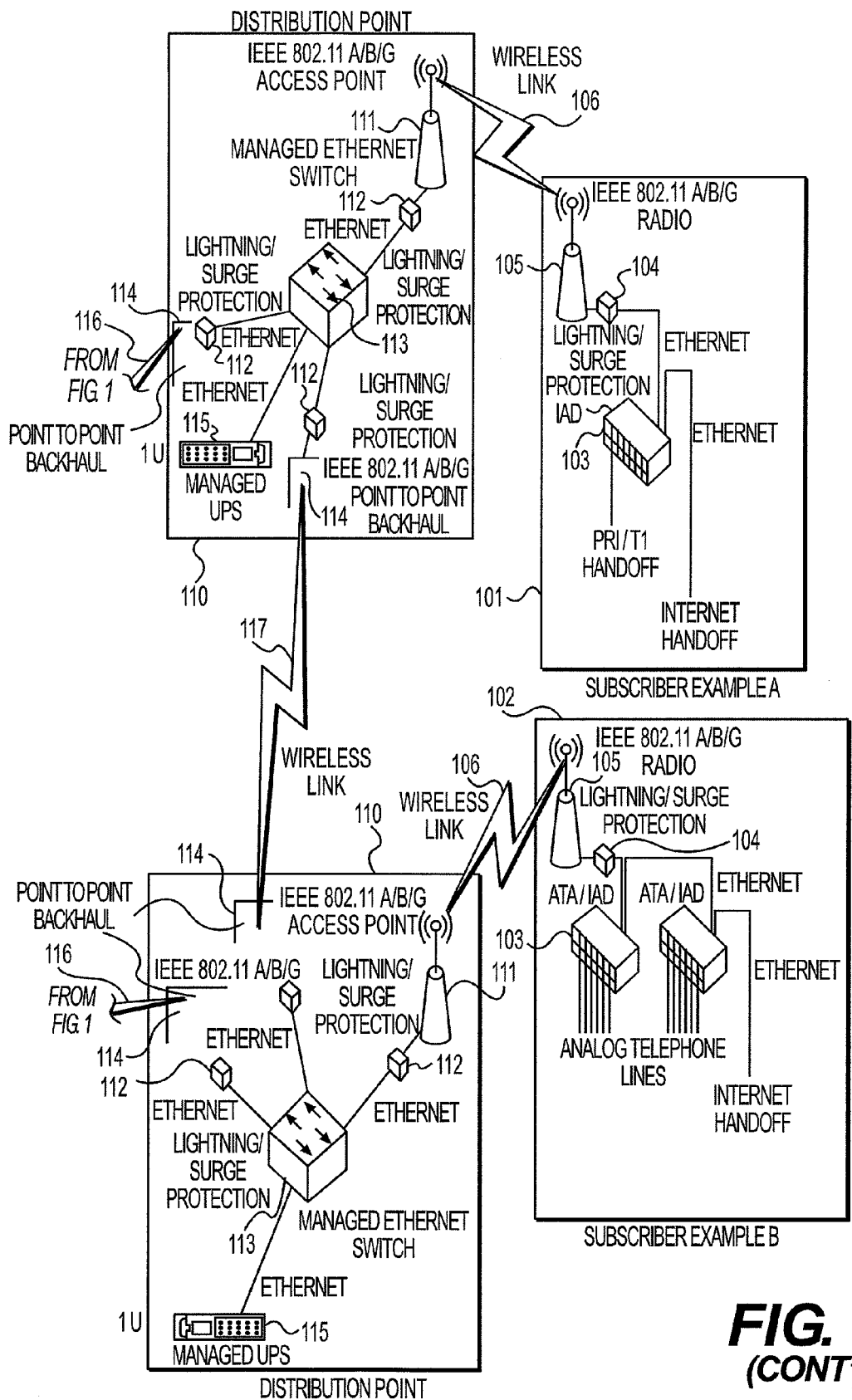
Figure 2C:
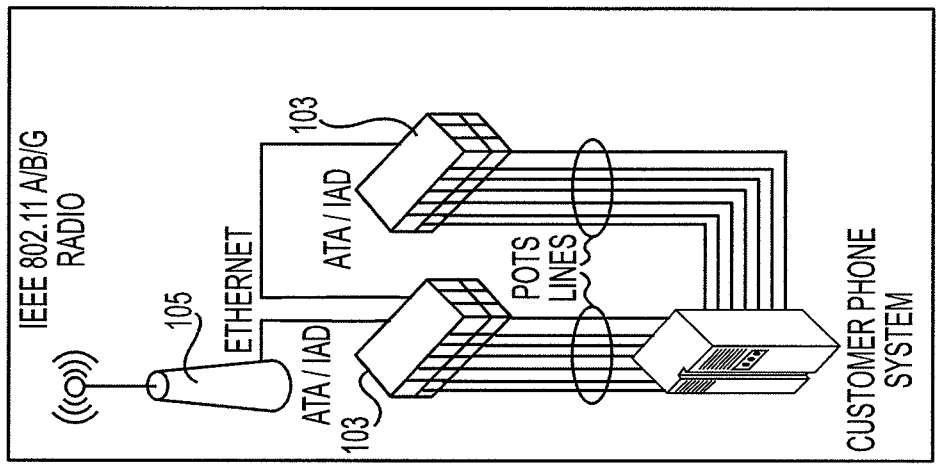
FIG. 2c is a diagram illustrating an analog Plain Old Telephone Service (POTS) subscriber configured in accordance with an embodiment of the invention.
Figure 2B:
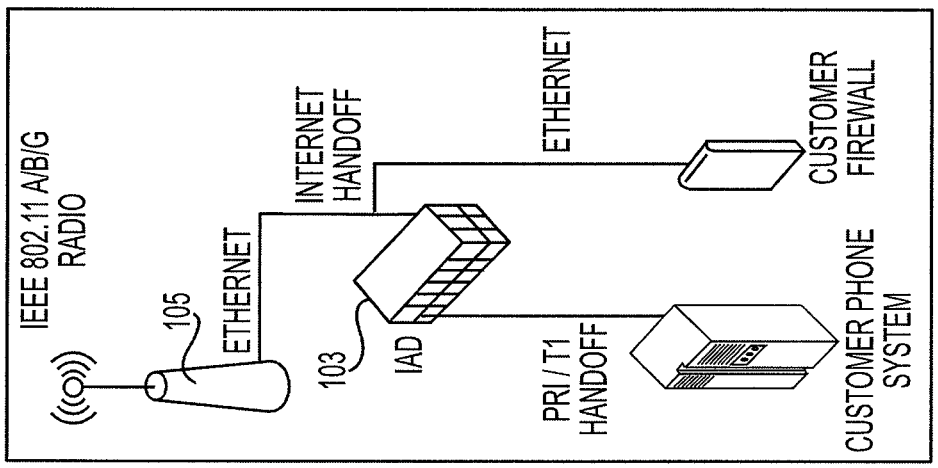
FIG. 2b is a diagram illustrating a PRI/T1 PSTN and broadband Internet services subscriber configured in accordance with an embodiment of the invention.
Figure 2A:
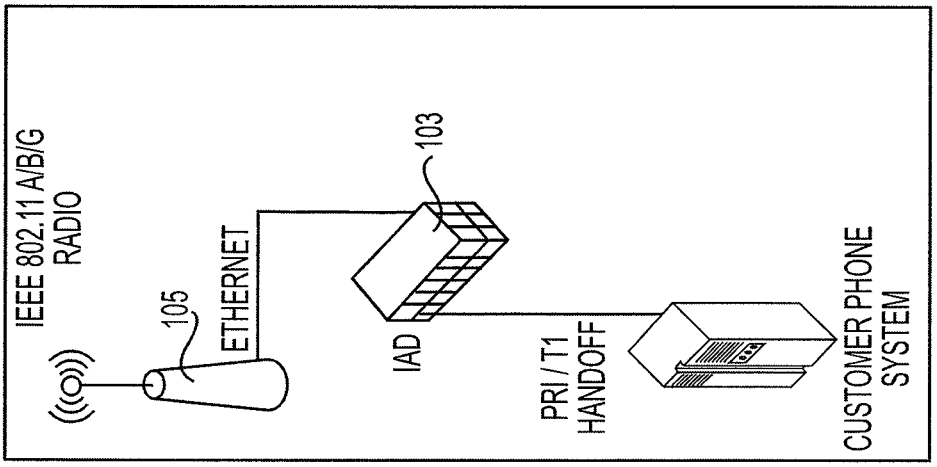
FIG. 2a is a diagram illustrating a Primary Rate Interface (PRI)/T-carrier 1 (T1) PSTN service subscriber configured in accordance with an embodiment of the invention.
Figure 2F:
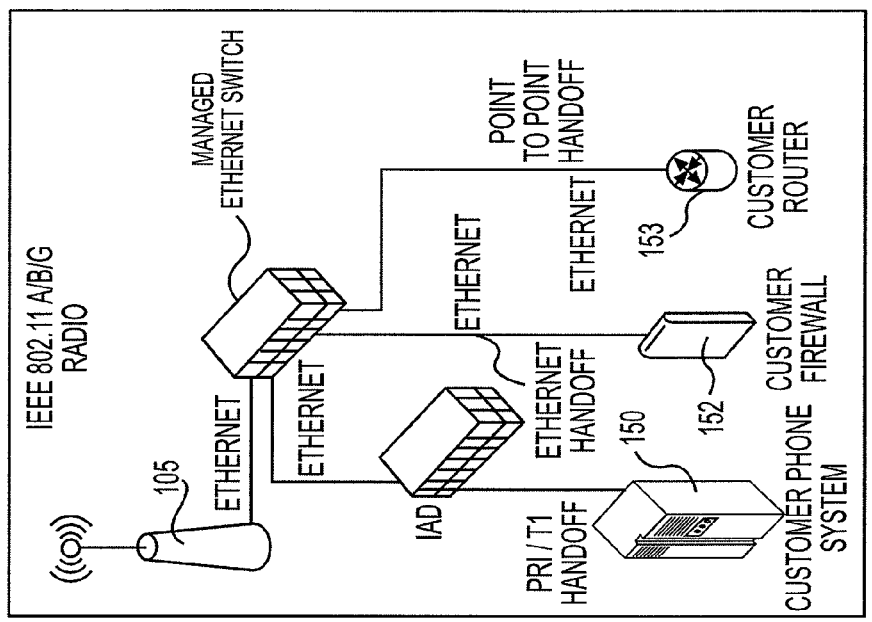
FIG. 2f is a diagram illustrating a PRI/T1 PSTN, broadband Internet and private data services subscriber configured in accordance with an embodiment of the invention.
Figure 2E:
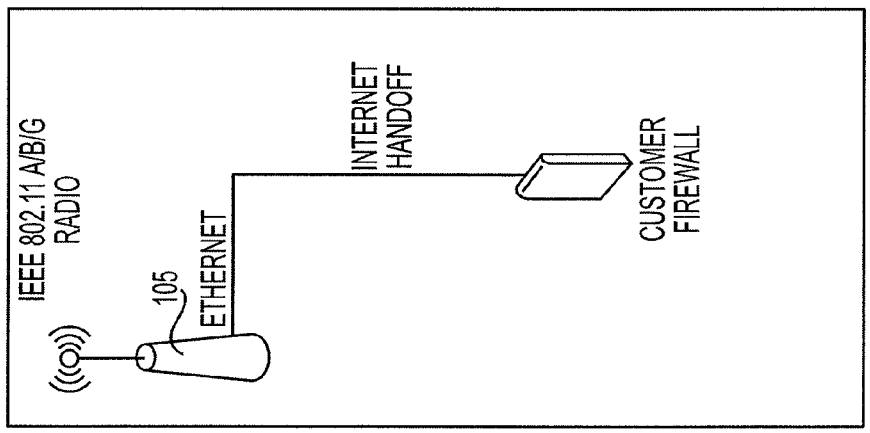
FIG. 2e is a diagram illustrating a broadband Internet service subscriber configured in accordance with an embodiment of the invention.
Figure 2D:
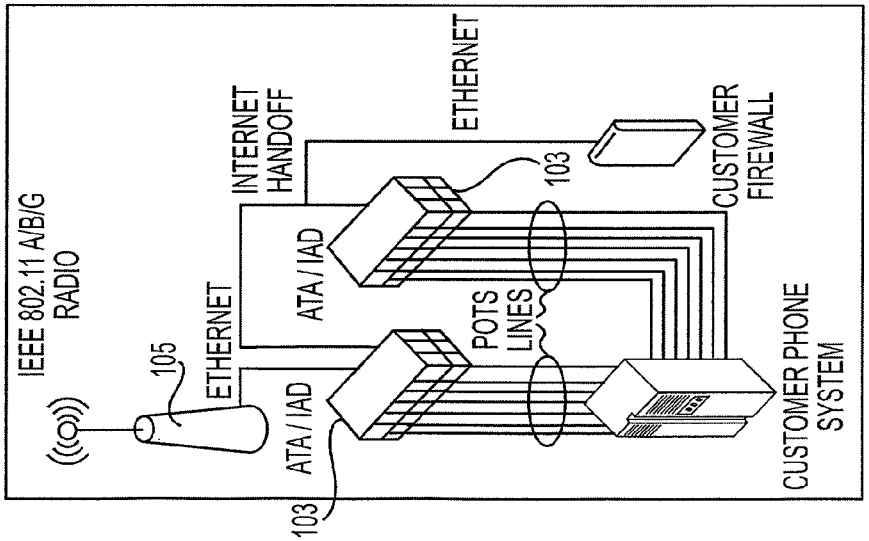
FIG. 2d is a diagram illustrating an analog POTS and broadband Internet services subscriber configured in accordance with an embodiment of the invention.
Figure 2I:
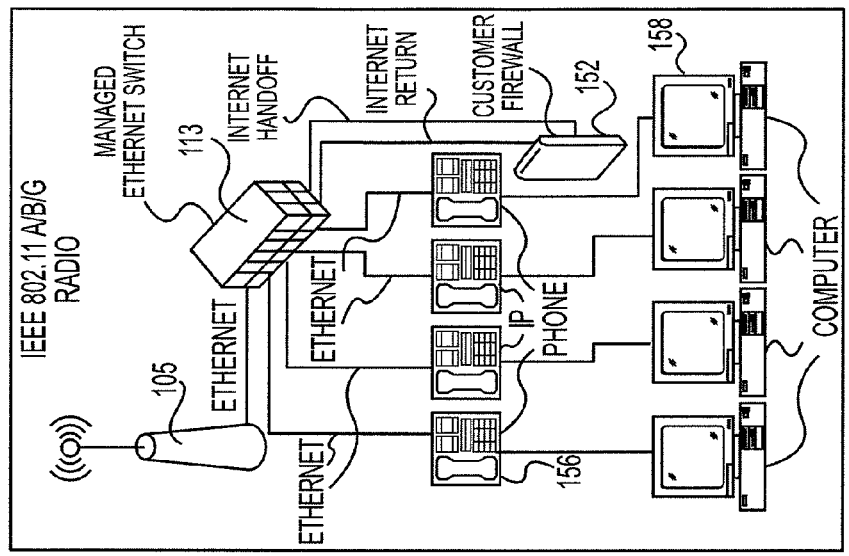
FIG. 2i is a diagram illustrating a hosted VoIP, broadband Internet and private data services subscriber configured in accordance with an embodiment of the invention.
Figure 2H:
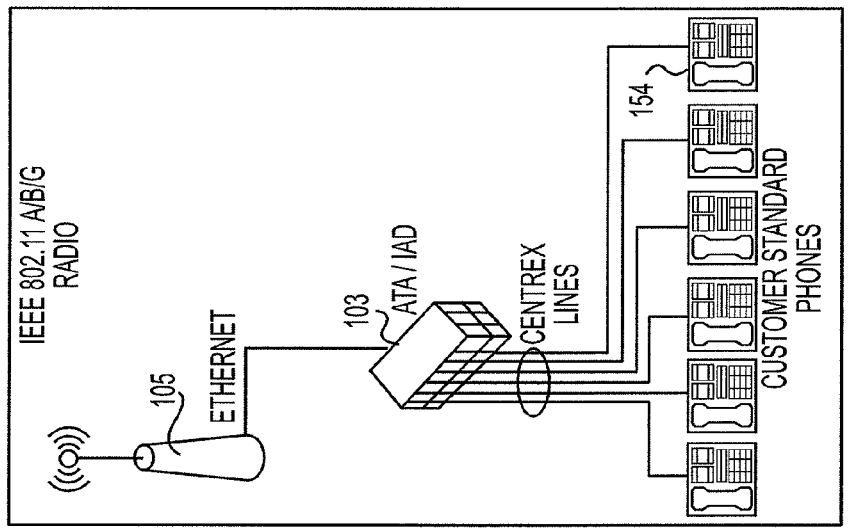
FIG. 2h is a diagram illustrating an analog CENTREX service subscriber configured in accordance with an embodiment of the invention.
Figure 2G:
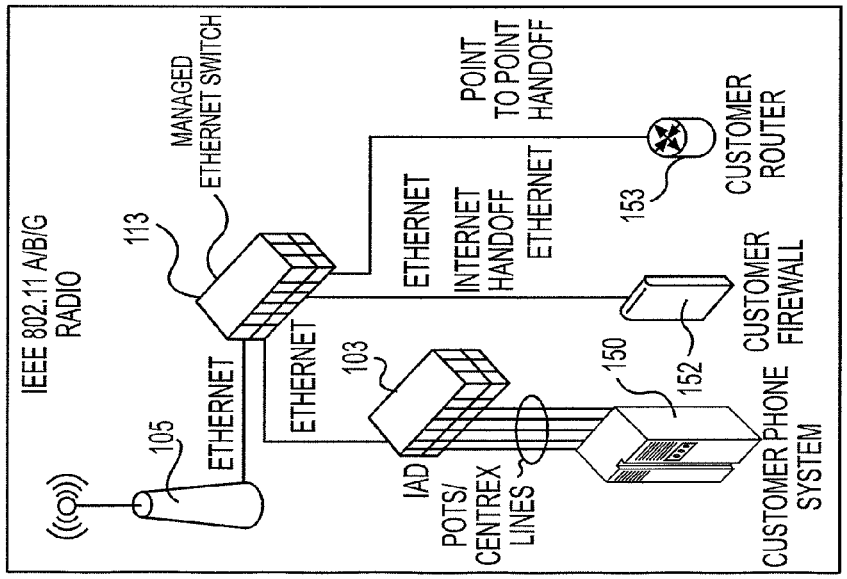
FIG. 2g is a diagram illustrating an analog POTS/Central Exchange (CENTREX), broadband Internet and private data services subscriber configured in accordance with an embodiment of the invention.

FIG. 1 is a representation of the general overview of a complete apparatus and method 100 constructed in accordance with an exemplary embodiment of the invention. Whereby, the apparatus and method 100 include a subscriber or customer A 101 and B 102. The subscribers 101 and 102 include one or more Integrated Access Devices (IAD) 103 which are used to convert standard analog voice signals into VoIP and a fixed wireless radio 105 which connects the subscriber to the closest distribution point 110 using a wireless 106 connection. The fixed wireless radio 105 is also protected by an Ethernet surge/lightning arrestor 104 to protect the fixed wireless radio 105 and any other internal equipment such as the IAD 103. All these devices are interconnected via Ethernet cabling. Examples of alternative configurations of subscribers 101 and 102 are illustrated in FIGS. 2a through 2i, which may further include a customer phone system 150, a customer firewall 152, a customer router 153, one or more customer standard phones 154, one or more IP phones 156, and one or more computers 158.

With renewed reference to FIG. 1, the IAD 103 is responsible for marking each outbound packet with a Class of Service (CoS) marking using the known 802.1p standard. Using this standard, each packet is given a marking of 0 to 7. The higher the CoS number, the higher the priority of that packet in which it is associated with. Voice data packets are marked with a CoS of 5 and Internet data packets are marked as a CoS of 0. With that in mind, voice data packets will always have priority over internet data packets to ensure near toll grade quality voice. As data is passed to the fixed wireless radio 105 from the IAD 103, the CoS of each packet is read to determine the order in which packets will be sent wirelessly to the Access Point 111 located at a distribution point 110.

The distribution point 110 includes one or more Access Point radios 111, one or more backhaul radios 114, surge/lightning protectors 112, a switch/router 113 and a managed Uninterruptable Power Supply (UPS) 115. Some distribution points may have two or more backhauls for redundancy or multiple feed points. The managed UPS 115 is responsible for keeping the distribution point 110 running during a power outage. Preferably, the managed UPS 115 size may be large enough to power the distribution point 110 for at least one hour minimum. The managed UPS 115 may also notify the management server 141 of the power failure. The Access Point radio 111 is responsible for connectivity from the Distribution Point 110 to the subscriber site 101/102. Each access point radio 111 is a Point to Multipoint (PTMP) radio. A single PTMP radio is capable of connecting to multiple subscriber fixed wireless radios 105. Data from a subscriber 101/102 is passed from a subscriber radio 105, to the Access Point 111 and then to the switch/router 113 via an 802.1q Ethernet trunk. Upon the data entering the switch/router 113, the data's CoS marking is checked to determine the data's priority. Based upon the CoS marking provided by known 802.1p standards, the data is inserted into 1 of 8 possible queues (0 to 7) to leave the switch/router 113 with queue 7 having the highest priority. Before the data can actually leave the switch/router 113, the switch/router 113 will check the routing tables and the path cost of the available backhauls 114 ports to determine the lowest cost back to the Network Operations Center (NOC) 120 using known protocols such as Enhanced Interior Gateway Routing Protocol (EIGRP) and Spanning Tree Protocol (STP). The path cost is determined by link availability, link speed, link utilization and the distance back (hops) to the Core Router 121. In this representation, the wireless backhauls labeled 116 would be the shortest path back to the network Operation Center 120. But if either of the backhauls labeled 116 were to be unavailable, the backhaul labeled 115 would be utilized to guarantee uptime. Once the lowest cost has been established, the data will be passed out of the switch/router 113 by CoS priority to the appropriate Point to Point (PTP) backhaul radio 114 via an 802.1q Ethernet trunk. The backhaul radios are a bridged PTP radio system. In that they simply pass traffic from point A to point B. The backhaul radios understand CoS markings and will prioritize traffic as needed, but since the switch/router 113 has already prioritized the data before the backhaul radio 114 has received it, this feature is only used as a backup. Depending on the path chosen for the data, the data will either arrive at the NOC 120 or arrive at another distribution point 110 and repeat the entire process again with the design to arrive at the NOC 120 in the fewest hops possible.

Once the data enters the NOC 120, the data will flow from the PTP backhaul radio 138 thru a surge/lightning protector 122 into the core router 121 via an 802.1q Ethernet trunk. Once again, the CoS markings are examined on each packet for priority following known 802.1p standards. Voice data packets will be forwarded to the Class 4/5 Softswitch 124 via Ethernet with the highest priority and Internet data packets will be forwarded out a transport 137, in this representation is a DS-3 Coaxial 137 circuit to the upper level Internet provider 136. The core router 121 may also forward Internet data packets back out to a distribution point 110 if the intended destination is a subscriber on the private network. The core router 121 also protects the private network using internal access-lists and by also utilizing Network Address Translation (NAT) where needed to neutralize outside threats.

Voice data packets that are forwarded on to the Softswitch 124 will leave the Softswitch 124 in one of many ways. The Softswitch 124 will have one or more fiber Point of Interconnection (POI) 126 & 128 to the Incumbent Local Exchange Carrier (ILEC) 125 & 127. The POI will consist of several Time Division Multiplexing (TDM) trunks for routing voice traffic to the ILEC 125 & 127 and also to receive voice traffic from the ILEC 125 & 127 destined for a subscriber on the private network. The Softswitch 124 is responsible for converting VOIP packets to TDM Packets destined for the ILEC 125 & 127 or converting TDM Packets to VOIP packets, assigning a CoS priority for packets destined to a subscriber IAD 103. In order for the POI 126 & 128 with the ILEC 125 & 127 to function properly, two Signaling System 7 (SS7) links 135 to a Signal Transfer Point (STP) and Signal Control Processor (SCP) provider 134 are utilized for redundancy. The connections to a STP/SCP provider 134 are required in order to lookup a destination for an originating phone call and to lookup Caller Name (CNAM) for a terminating phone call.

Another needed element for the POI to function properly is a GPS Clock 131. The GPS clock 131 enables the Softswitch 124 to time the packets across the POI 126 & 128 properly with the ILEC 125 & 127. The GPS Clock 131 connects directly to the Softswitch 124 via two T1 circuits 130 for redundancy. The GPS clock 131 has an antenna 133 located outside with an open view of the sky. The antenna 133 is connected to the GPS clock 131 using a coaxial cable 132. The Softswitch 124 will be able to terminate calls to a VOIP Voice Mail Platform 129 as well. The VOIP Voice Mail Platform 129 is connected to the core router 121. Voice data packets terminating to the VOIP Voice Mail Platform 129 will travel from the Softswitch 124 thru the core router 121 and terminate at the VOIP Voice Mail Platform 129. Voice data packets will be marked with a CoS of 5 for priority. Lastly, a VOIP Long Distance (LD) carrier is used in this invention. This is a virtual circuit 139 & 140. The VOIP LD traffic is carried over the physical Internet circuit 137 and terminates to the LD VOIP provider via TCP/IP. Likewise, the LD VOIP carrier is also able to terminate traffic to the Softswitch 124. Some inbound and outbound LD voice traffic will terminate or originate directly to or from the Softswitch 124 as illustrated by the virtual circuit 139. Other traffic will need to be passed thru a Session Boarder Controller (SBC) 123 for security as illustrated by the virtual circuit 140. The SBC 123 is directly connected to the core router 121 and it is a gateway for voice data packets only. All other traffic attempted to be passed thru the SBC 123 will be blocked. Additionally, incoming voice data packets will only route thru the SBC 123 to the Softswitch 124.

The Management Server 141 is used to monitor the network. Using Simple Network Management Protocol (SNMP) queries that are performed on the access point's 111, subscriber radio's 105, switches'/router's 113 & 121, backhaul PTP radio's 114 & 138, Softswitch 124, IAD's 103, managed UPS's 115 and any other network equipment that would need to be monitored. This monitoring allows for proactive alerts to low signal levels on the wireless equipment to responsive alerts that equipment has failed or that a power outage is occurring at a distribution point. The management server 141 is also able to generate reports on equipment within the network in order to guarantee Service Level Agreements (SLA) to subscribers.

With this apparatus and method, subscribers 101 and 102 are able to both originate traffic to various sources thru the use of a fixed wireless private network consisting of distribution points 110 and a central NOC 120. Likewise, the various sources are able to terminate traffic to the subscriber 101 and 102 thru the same network.

Figure 3:
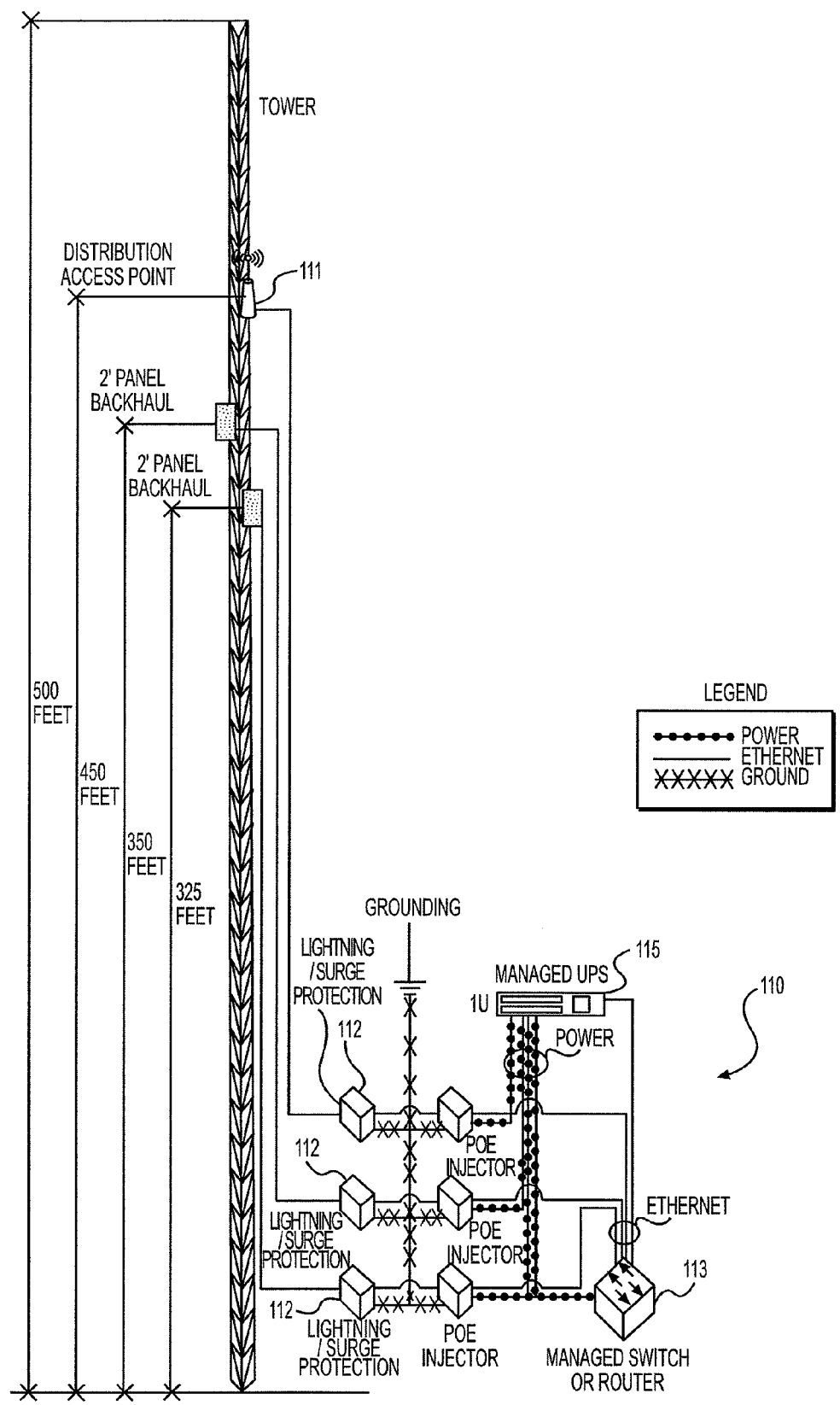
FIG. 3 is a diagram illustrating a distribution point configured in accordance with an embodiment of the invention.

FIG. 3 illustrates the interconnection of the components of a distribution point 110 in accordance with an embodiment of the present invention.

Figure 4:
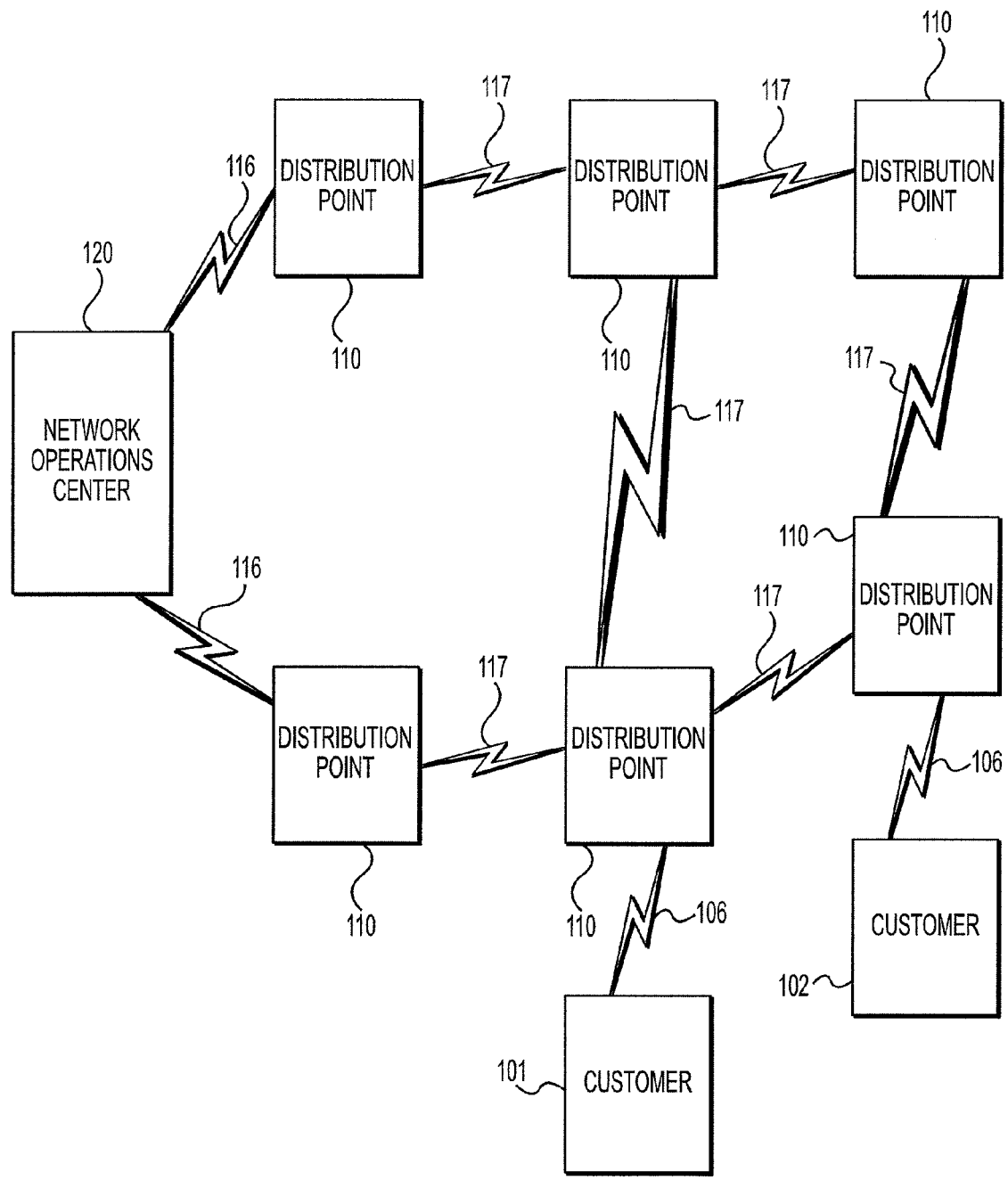
FIG. 4 is a diagram illustrating a system in accordance with an embodiment of the present invention in which multiple distribution points are interconnected.

FIG. 4 illustrates a network configuration including a plurality of interconnected distribution points 110.

Figure 5A:
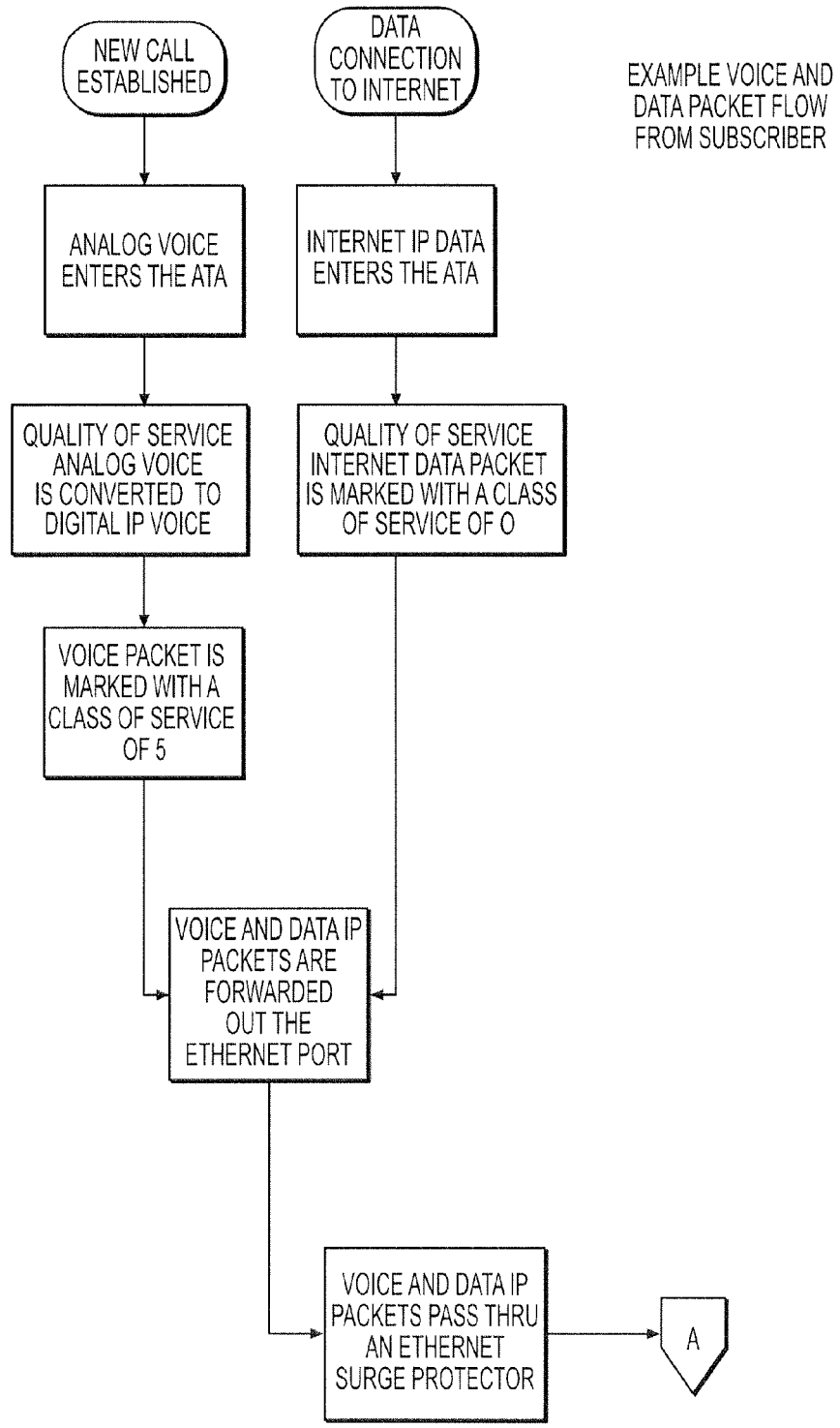
FIGS. 5A-5G are flow charts which illustrate a method for transferring voice and data packets between a subscriber and a soft switch in accordance with an embodiment of the present invention.

FIGS. 5A-5G are collectively a flow chart which illustrates the flow and prioritization of voice and/or data packets between a subscriber and a destination, such as a soft switch. With reference to FIG. 5A, a voice call is initiated or a connection to the Internet is initiated at a subscriber ATA unit. At first, voice and data packets at an ATA unit start with different settings and then converge on the IP network. To start, an analog voice call is first initiated at the ATA. After the analog voice enters the ATA, it is converted to digital IP voice packets. The voice packets are then marked for QoS with a CoS value of 5. Likewise, Internet data packets that enter the ATA are marked for QoS with a CoS 0 which is the lowest priority. Once both voice and data IP packets have been marked with a QoS value, they are forwarded out through the ATA's Ethernet port. The packets will then pass thru an Ethernet Surge Protector and then to the Subscribers Fixed Wireless Radio.

Figure 5B:
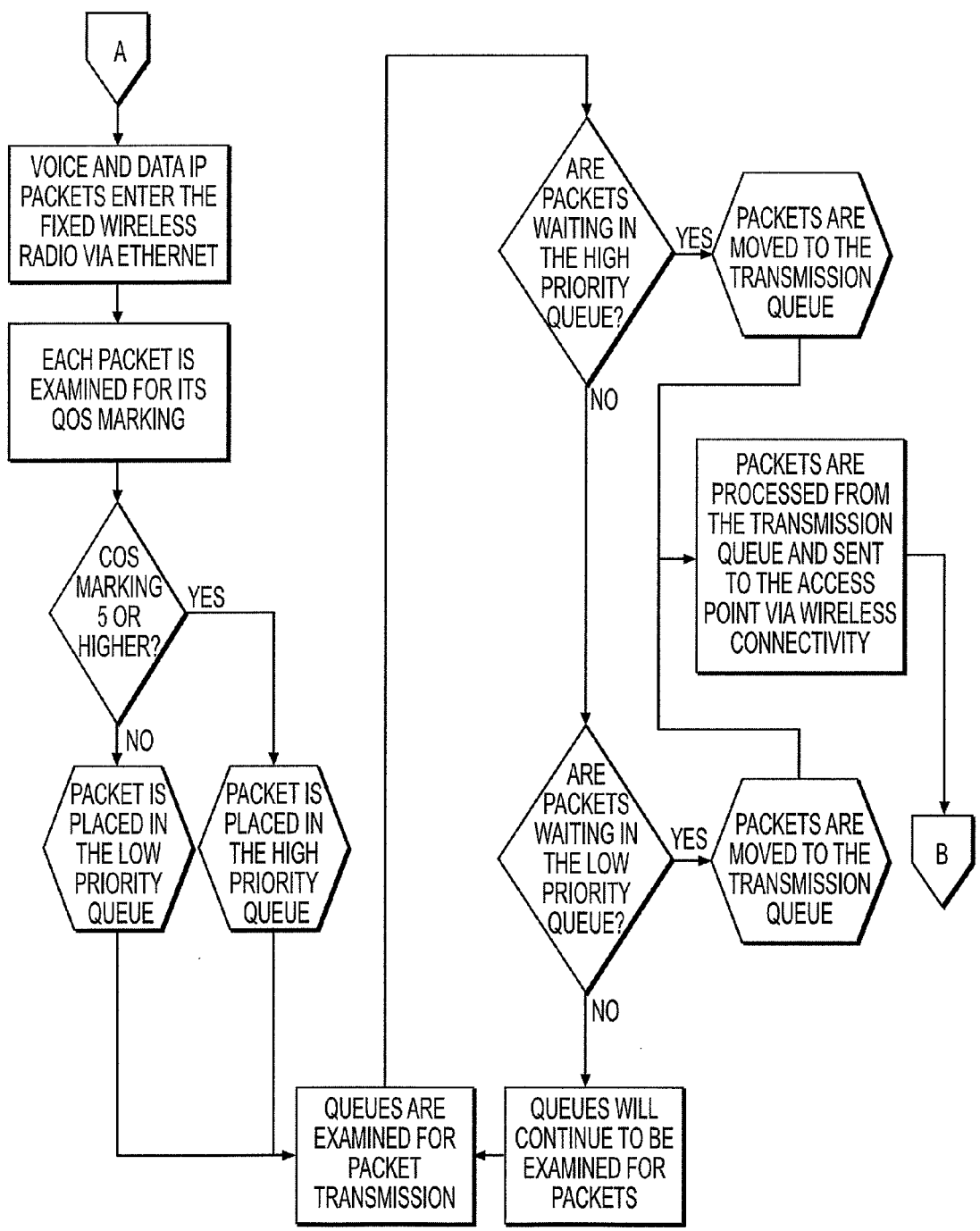

With reference to FIG. 5B, Voice and Data IP packets enter the fixed wireless radio thru an Ethernet port. Then each packet's QoS marking is examined. Fixed wireless radios may have only two queues, a high priority and a low priority. Packets with a CoS marking of 5 or higher are placed in the high priority queue. Packets with a CoS marking below 5 are placed in the low priority queue. The queues in the radio may constantly be monitored for packets waiting to be sent. The high priority queue will always be serviced first. Any packets that are in the high priority queue will be moved to the transmit queue before packets in the low priority queue. When no packets are waiting in the high priority queue, then packets in the low priority queue will be moved to the transmission queue. The queues will continue to be monitored in this fashion at all times. Once packets are moved to the transmission queue, they will be transmitted in the order they arrived in the transmission queue to the Access Point via wireless connectivity.

Figure 5C:
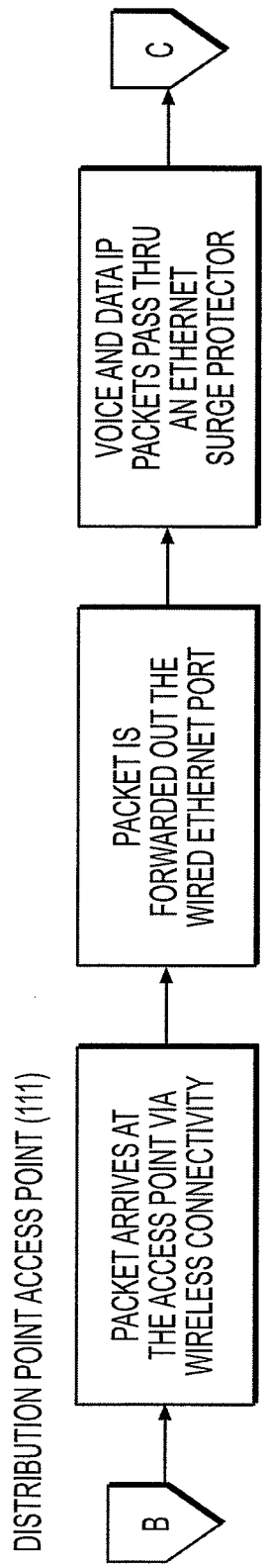

With reference to FIG. 5C, packets initially enter the Distribution Access Point via wireless connectivity. Packets are then simply forwarded out the Access Points Ethernet port. Again, the packets flow through a Ethernet Surge Protector and then on to the Distribution Point Switch/Router.

Figure 5D:
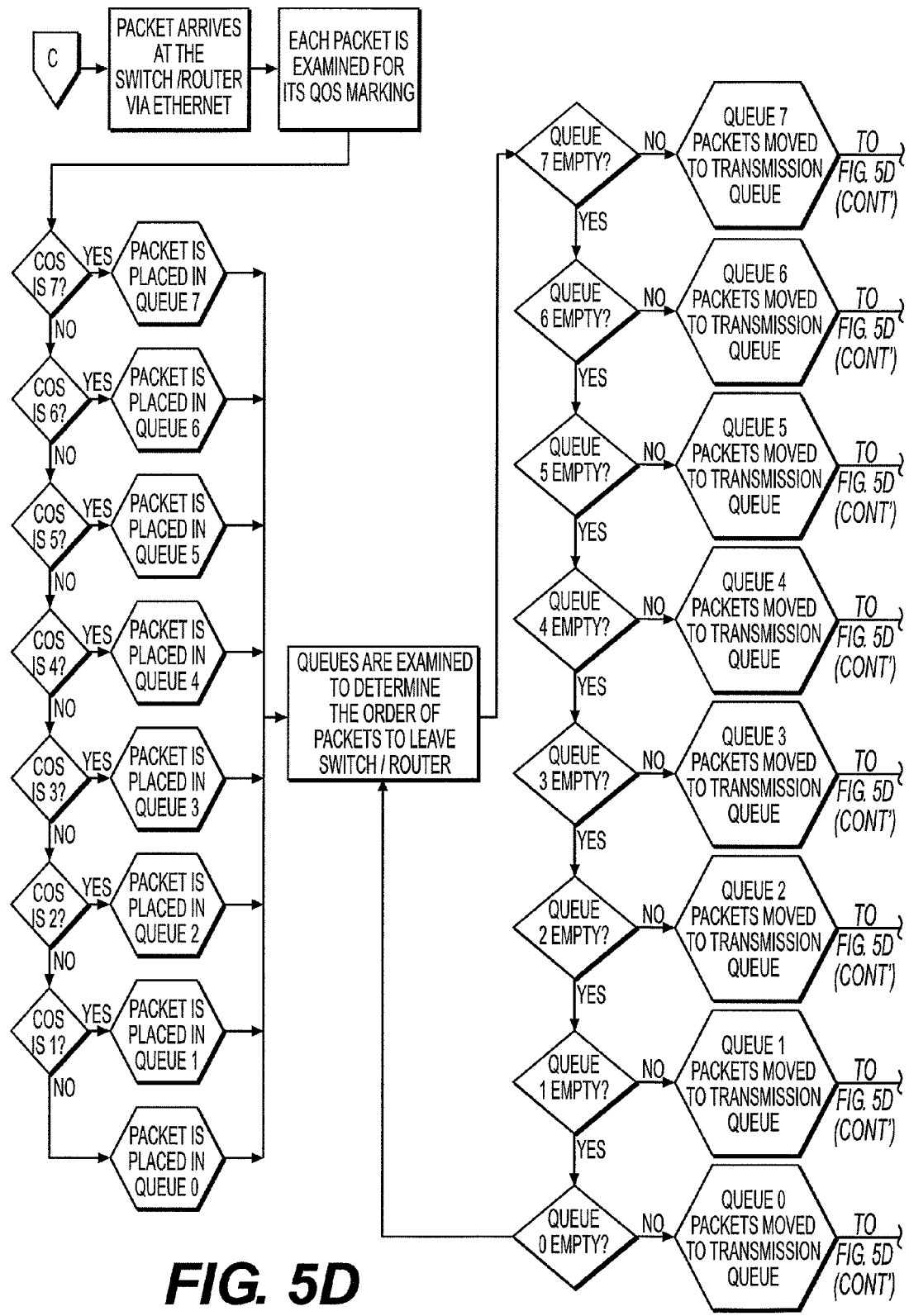
Figure 5D:
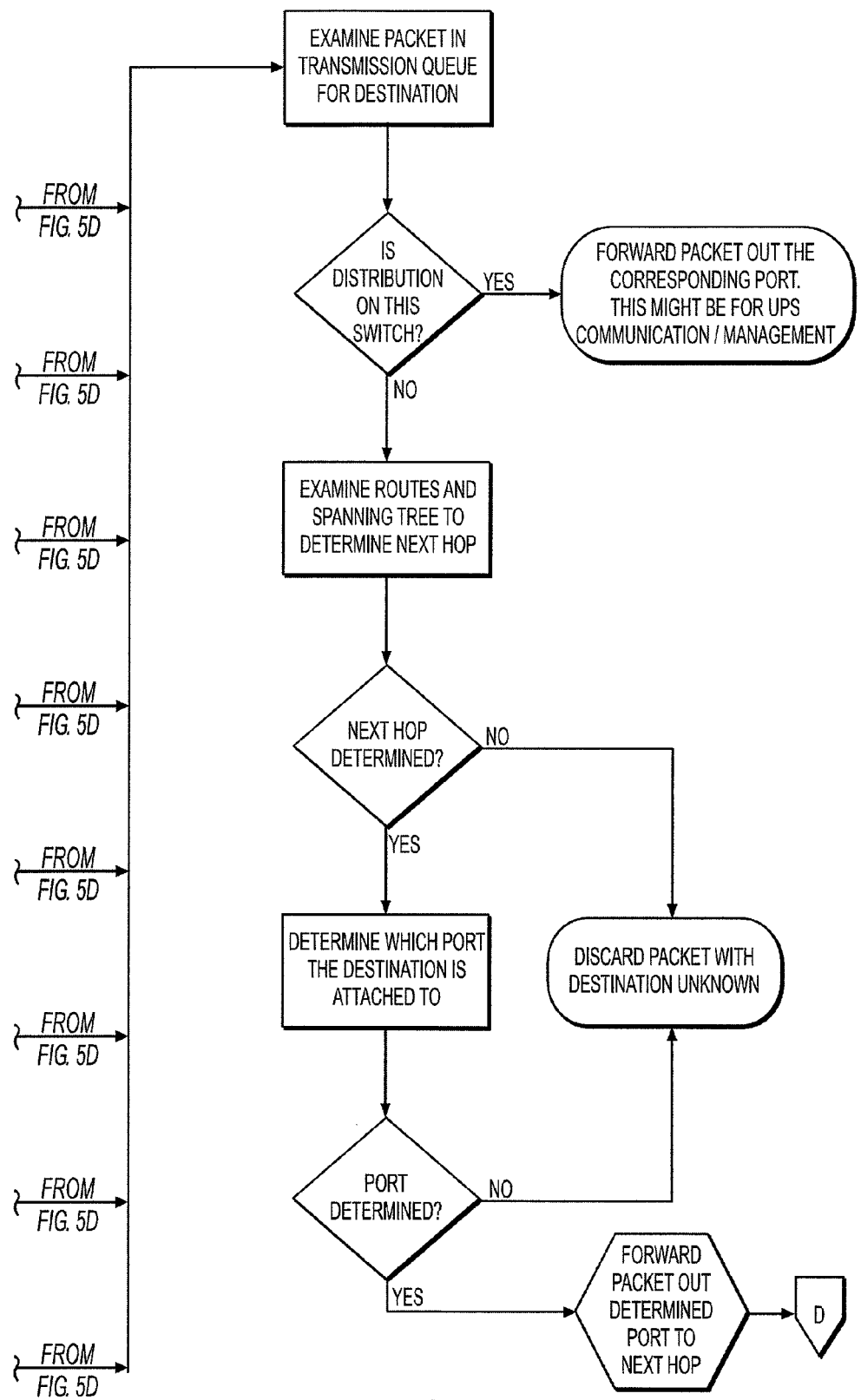

With reference to FIG. 5D, packets now enter the Distribution Point Switch/Router via Ethernet. As the packet enters the Switch/Router, the QoS markings are again examined. Switch/Routers have a more complex QoS system. Each CoS has an independent queue setup for priority. CoS 7 is queue 7, CoS 6 is queue 6, CoS 5 is queue 5, CoS 4 is queue 4, CoS 3 is queue 3, CoS 2 is queue 2, CoS 1 is queue 1 and all unmarked packets (also known as CoS 0) are placed in queue 0. Every packet will be placed in its appropriate queue. The switch/router also monitors the queues constantly for packets to transmit. Queue 7 has the highest priority and queue 0 has the lowest. Packets waiting in queue 7 will always be transmitted before all other queues. Once queue 7 is emptied, queue 6 will be serviced and packets in that queue will be moved to the transmission queue. This process will continue all the way down to queue 0. Now the switch/router will process packets in the transmission queue in the order they were submitted into the queue. Each packet will have its destination examined. If the destination is a local device attached to this switch/router, it will be forwarded out the appropriate port. If the destination is not on this switch/router, the ARP and routing tables are examined to determine the next hop. If the destination is not able to be determined, the packet will be discarded. Once the destination has been determined, the switch/router needs to determine which port the destination is attached to. Again, if the switch/router cannot determine which port, the packet will be discarded. Otherwise, the packets will be forwarded out the appropriate port on its way to the next hop.

Figure 5E:
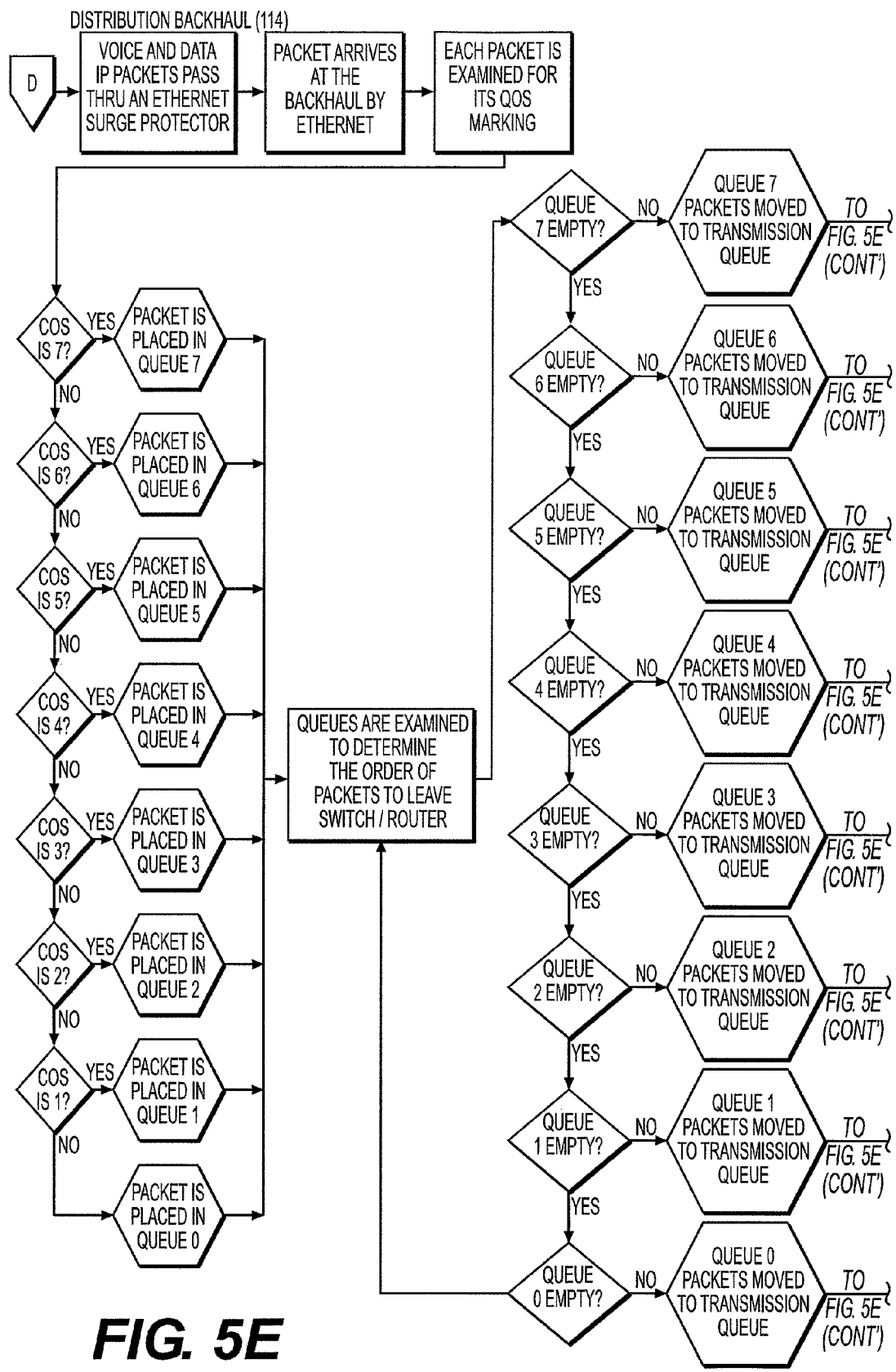

With reference to FIG. 5E, the packet will now go through a distribution backhaul. On the way to the backhaul radio, the packet will again pass thru an Ethernet Surge Protector. The packets QoS markings are again examined. Backhaul radios have a QoS system much like the Switch/Routers. Each CoS has an independent queue setup for priority. CoS 7 is queue 7, CoS 6 is queue 6, CoS 5 is queue 5, CoS 4 is queue 4, CoS 3 is queue 3, CoS 2 is queue 2, CoS 1 is queue 1 and all unmarked packets (also known as CoS 0) are placed in queue 0. Every packet will be placed in its appropriate queue. The backhaul also monitors the queues constantly for packets to transmit. Queue 7 has the highest priority and queue 0 has the lowest. Packets waiting in queue 7 will always be transmitted before all other queues. Once queue 7 is emptied, queue 6 will be serviced and packets in that queue will be moved to the transmission queue. This process will continue all the way down to queue 0. Now the backhaul will process packets in the transmission queue in the order they were submitted into the queue. The packet will be transmitted wirelessly to the other side of the backhaul. Once the packet arrived on the other side, it will be forwarded out the Ethernet port. This side could either be the Network Operations Center (NOC) or could either be another Distribution Point. If this side is not the NOC, then the packets will pass thru another Ethernet Surge Protector and then repeat the process of going thru a Distribution Point. Otherwise, the packet will be passed on to the NOC Core Router.

Figure 5F:
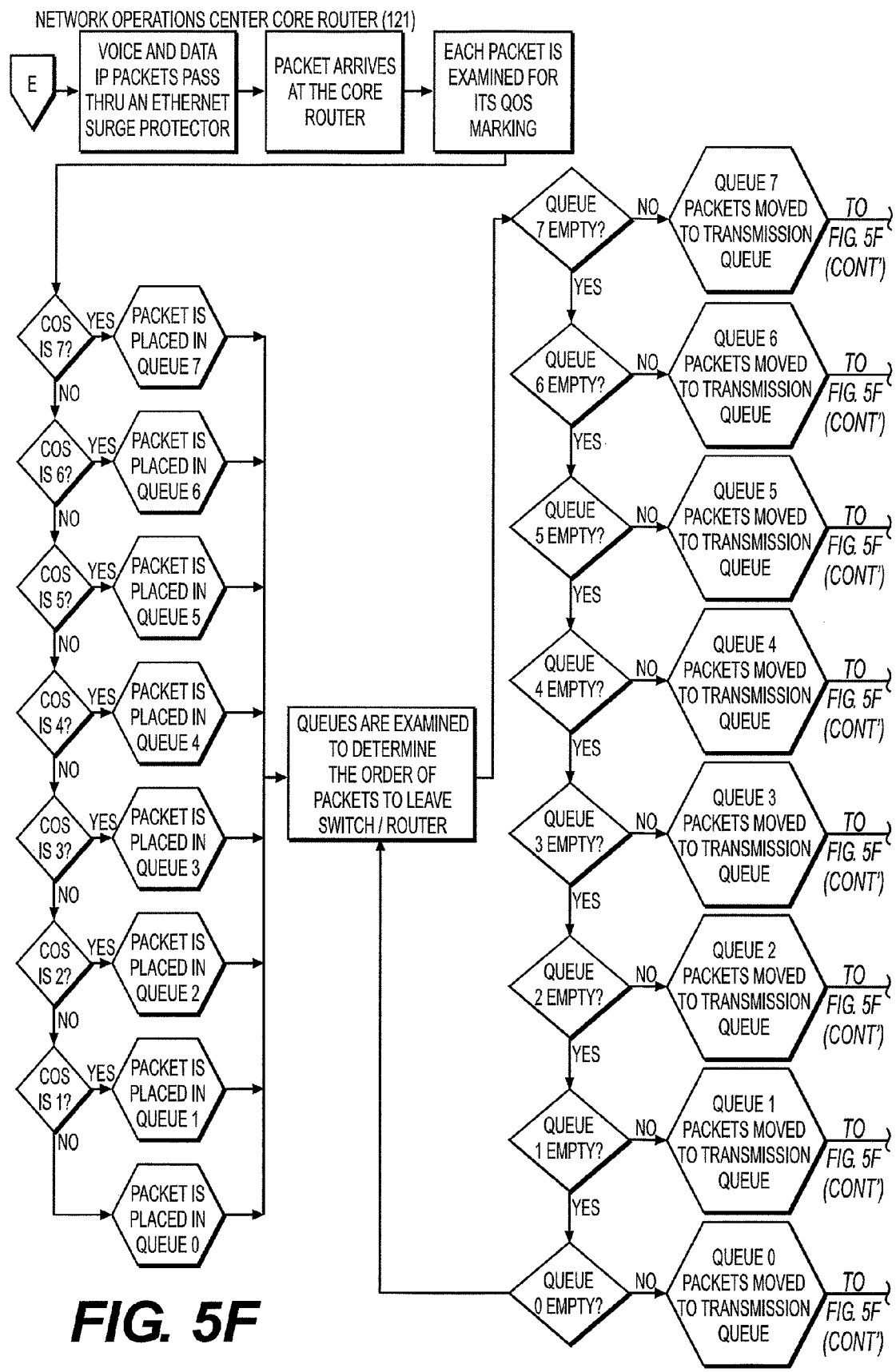

With reference to FIG. 5F, on the way to the NOC Core Router, the packet will again pass thru an Ethernet Surge Protector. As the packet enters the Router, the QoS markings are again examined. Each CoS has an independent queue setup for priority. CoS 7 is queue 7, CoS 6 is queue 6, CoS 5 is queue 5, CoS 4 is queue 4, CoS 3 is queue 3, CoS 2 is queue 2, CoS 1 is queue 1 and all unmarked packets (also known as CoS 0) are placed in queue 0. Every packet will be placed in its appropriate queue. The router also monitors the queues constantly for packets to transmit. Queue 7 has the highest priority and queue 0 has the lowest. Packets waiting in queue 7 will always be transmitted before all other queues. Once queue 7 is emptied, queue 6 will be serviced and packets in that queue will be moved to the transmission queue. This process will continue all the way down to queue 0. Now the router will process packets in the transmission queue in the order they were submitted into the queue. Each packet will have its destination examined. If the packet is a voice packet and its destination is the Softswitch, it will be passed out the appropriate port to the Softswitch. If it is not a voice packet, then the router will see if the destination is on the local network. If it is not on the local network, the packet will be forwarded out the DS-3 interface toward the Internet. If the packet is on the local network, then the packet will be forwarded out the appropriate port on its way back out to a distribution point for delivery to the appropriate subscriber.

Figure 5G:
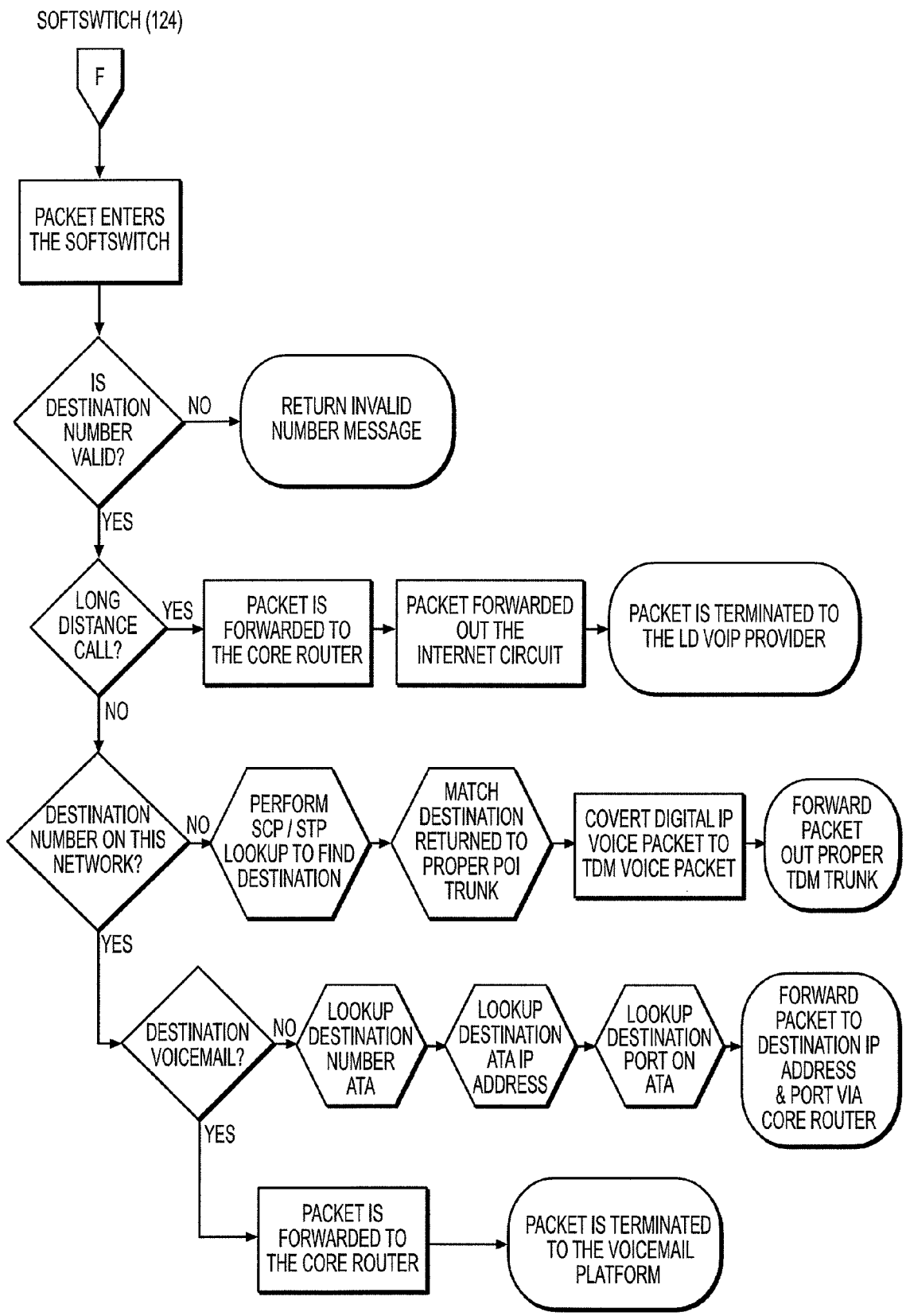

With reference to FIG. 5G, if the packet was a voice packet and forwarded to the Softswitch, several different validations will be computed on the calls packet. First is to make sure the packets call is a valid number. If it is not, a message will be returned that the number was invalid. If it is a valid number, then the call is checked if it is a local or long distance call. If it is long distance, then the packet is forwarded back to the router, sent out the Internet circuit and terminated to the LD VoIP provider. If the call is not long distance then it is checked to see if the destination is on the local voice network. If the destination is not on the local voice network, then the Softswitch will perform a SCP/STP lookup on the destination number. Upon having a successful lookup, the destination is matched to the local POI trunk to the ILEC. Since to local ILEC is TDM only, the digital VoIP packet will be converted to analog TDM packet and then sent out the proper POI trunk. If the destination is on the local network, then it firsts looks to see if the destination is the local voicemail platform. If the destination is the local voicemail platform, then the packet is forwarded back to the core router to be terminated at the voicemail platform. If not, then the Softswitch will look up the destinations numbers local ATA unit, then the local ATA units IP address, and then the ATA units port. Once this information is found, the packet will be forwarded back to the Core router for delivery to the ATA.

It will be apparent to those of ordinary skill in the art that variations and modifications of the present invention can be made without departing from the scope or spirit of the invention.

What is claimed is:

1. A system for delivering public switched telephone network service and broadband internet access using Transfer Control Protocol/Internet Protocol (TCP/IP) over an Ethernet based transport network through a private fixed wireless network, the system comprising:
 a subscriber station radio;
 a first fixed wireless distribution point; and
 a network operations center; wherein
 the subscriber station radio is wirelessly connected to the first fixed wireless distribution point;
 the first fixed wireless distribution point is wirelessly connected to the network operations center; and wherein the network operations center comprises:
 a backhaul radio;
 a managed Uninterruptible Power Supply (UPS);
 a core router;
 a Class 4/5 Softswitch;
 a Session Border Controller;
 a Voicemail Platform;
 a management server; and
 a Global Positioning Satellite (GPS) Clock, wherein
 the backhaul radio wirelessly connects the network operations center to the first fixed wireless distribution point,
 the core router is connected to the backhaul radio via Ethernet trunk,
 the core router is connected to an upper level Internet provider using a Digital Service-3 (DS-3) coaxial circuit, fiber circuit, or Ethernet circuit,
 the managed UPS is connected to the core router via Ethernet,
 the Session Border Controller is connected to the core router via Ethernet,
 the Class 4/5 Softswitch is connected to the core router via Ethernet,
 the Class 4/5 Softswitch is connected to at least one Incumbent Local Exchange Carrier (ILEC) using at least one fiber Point Of Interconnection (POI),
 the Class 4/5 Softswitch is connected to two Signaling System 7 (SS7) links, a Signal Transfer Point (STP), and a Signal Control Processor (SCP),
 the Class 4/5 Softswitch is connected to the GPS Clock,
 the Voicemail Platform is connected to the core router via Ethernet,
 the management server is connected to the core router via Ethernet,
 the Class 4/5 Softswitch is connected to a Voice Over Internet Protocol (VOIP) long distance carrier using Transfer Control Protocol/Internet Protocol (TCP/IP),
 the Session Border Controller is connected to the VOIP long distance carrier using TCP/IP, and
 the Session Border Controller receives incoming data packets from the VOIP long distance carrier.

2. The system of claim 1, further comprising an Ethernet surge/lightning arrestor connected between the backhaul radio and the core router via Ethernet trunk.

3. The system of claim 1, wherein the GPS Clock is connected to an antenna.

4. The system of claim 1, wherein the GPS Clock is connected to the Class 4/5 Softswitch using redundant T1 circuits.

5. The system of claim 1, wherein:
the incoming data packets comprise voice data packets and Internet data packets;
the Session Border Controller blocks all incoming data packets other than voice data packets; and
the Session Border Controller routes the voice data packets to the Class 4/5 Softswitch.

6. The system of claim 1, further comprising the Voicemail Platform connected to the core router via Ethernet.

7. The system of claim 6, wherein:
the incoming data packets comprise voice data packets and Internet data packets; and
the Class 4/5 Softswitch terminates the voice data packets to the Voicemail Platform.

8. The system of claim 1, further comprising a management server connected to the core router to monitor the private fixed wireless network using Simple Network Management Protocol (SNMP) queries.

9. The system of claim 8, wherein the management server generates alerts indicative of a condition on the private fixed wireless network, said condition being selected from the group consisting of: low signal level of wireless equipment, power level at a fixed wireless distribution point, packet loss, packet latency, packet jitter, Mean Opinion Score (MOS) of voice paths, and equipment failure.

10. The system of claim 8, wherein the management server stores historical information indicative of a condition on the private fixed wireless network, said condition being selected from the group consisting of: low signal level of wireless equipment, power level at a fixed wireless distribution point, packet loss, packet latency, packet jitter, Mean Opinion Score (MOS) of voice paths, and equipment failure.

11. The system of claim 8, wherein the management server generates reports on equipment within the network to guarantee Service Level Agreements (SLA).

12. The system of claim 1, wherein the at least one fiber POI comprises at least one Time Division Multiplexing (TDM) trunk.

13. A system for delivering public switched telephone network service and broadband Internet access using Transfer Control Protocol/Internet Protocol (TCP/IP) over an Ethernet based transport network through a private fixed wireless network, the system comprising:
a subscriber station radio having an integrated access device and a fixed wireless radio;
a fixed wireless distribution point having an access point radio, a backhaul radio, a managed UPS and a switch/router; and
a network operations center having a network operations center backhaul radio, a network operations center managed Uninterruptible Power Supply (UPS), a core router, a Class 4/5 Softswitch, a Session Border Controller, a GPS Clock, a voicemail platform, and a management server; wherein
the integrated access device marks outbound data packets with a Class of Service marking,
the outbound data packets comprise voice data packets and Internet data packets,
the fixed wireless radio is connected to the integrated access device via Ethernet,
the fixed wireless radio is wirelessly connected to the access point radio,
the switch/router is connected to the access point radio via Ethernet trunk,
the backhaul radio is connected to the switch/router via Ethernet trunk,
the managed UPS is connected to the switch/router via Ethernet,
the voicemail platform is connected to the core router via Ethernet,
the management server is connected to the core router via Ethernet,
the backhaul radio is wirelessly connected to the network operations center backhaul radio,
the core router is connected to the network operations center backhaul radio via Ethernet trunk,
the core router is connected to an upper level Internet provider using a Digital Service-3 (DS-3) coaxial circuit, fiber circuit, or Ethernet circuit,
the network operations center managed UPS is connected to the core router via Ethernet,
the Session Border Controller is connected to the core router via Ethernet,
the Class 4/5 Softswitch is connected to the core router via Ethernet,
the Class 4/5 Softswitch is connected to at least one Incumbent Local Exchange Carrier (ILEC) using at least one fiber point of interconnection (POI),
the Class 4/5 Softswitch is connected to two Signaling System 7 (SS7) links, a Signal Transfer Point (STP) and a Signal Control Processor (SCP),
the Class 4/5 Softswitch is connected to the GPS Clock,
the Class 4/5 Softswitch is connected to at least one Voice Over Internet Protocol (VOIP) long distance carrier using TCP/IP, and
the Session Border Controller is connected to the at least one VOIP long distance carrier using TCP/IP.

* * * * *